(12) United States Patent
Keener et al.

(10) Patent No.: US 6,759,474 B1
(45) Date of Patent: Jul. 6, 2004

(54) GLASS REINFORCED NYLON BLEND WITH IMPROVED KNITLINE STRENGTH

(75) Inventors: Brian D. Keener, Evansville, IN (US); Morris M.S. Lee, Newburgh, IN (US); Daniel L. Evans, Boonville, IN (US); Donald E. Julian, Evansville, IN (US); Thomas L. McElyea, Newburgh, IN (US); Deenadayalu Chundury, Newburgh, IN (US)

(73) Assignee: Ferro Corporation, Cleveland, OH (US)

(*) Notice: Subject to any disclaimer, the term of this patent is extended or adjusted under 35 U.S.C. 154(b) by 0 days.

(21) Appl. No.: 10/378,562

(22) Filed: Mar. 3, 2003

(51) Int. Cl.$^7$ .................................................. C08L 77/00
(52) U.S. Cl. .......................... 524/504; 524/505; 524/514
(58) Field of Search ................................. 524/504, 505, 524/514

(56) References Cited

U.S. PATENT DOCUMENTS

| | | | |
|---|---|---|---|
| 4,471,092 A | | 9/1984 | Andersen |
| 4,795,782 A | * | 1/1989 | Lutz et al. |
| 4,999,403 A | | 3/1991 | Datta et al. |
| 5,106,696 A | | 4/1992 | Chundury et al. |
| 5,248,728 A | | 9/1993 | Lee, Jr. |
| 5,278,231 A | * | 1/1994 | Chundury |
| 5,317,059 A | * | 5/1994 | Chundury et al. |
| 5,321,081 A | | 6/1994 | Chundury et al. |
| 5,324,782 A | | 6/1994 | Lee, Jr. |
| 5,374,680 A | | 12/1994 | Chundury et al. |
| 5,969,027 A | | 10/1999 | Chundury et al. |
| 6,072,011 A | | 6/2000 | Hoover |
| 6,087,435 A | | 7/2000 | Nakano et al. |
| 6,353,050 B1 | | 3/2002 | Bastiaens et al. |

* cited by examiner

*Primary Examiner*—Ana Woodward
(74) *Attorney, Agent, or Firm*—Rankin, Hill, Porter & Clark LLP

(57) ABSTRACT

The present invention provides a polymer alloy including from about 40% to about 75% by weight of at least one polyamide, from about 10% to about 50% by weight polypropylene, from about 0.01% to about 1.0% by weight of at least one block copolymer including a vinyl aromatic monomer and a conjugated diene, and also includes an unsaturated dicarboxylic reagent, from about 0.1% to about 5.0% by weight of at least one block copolymer or terpolymer, wherein the terpolymer may have an unsaturated dicarboxylic reagent grafted thereto, from about 0.01% to about 7.5% of a compatibilizing agent, and from about 5% to about 50% by weight of a filler. The alloy of the present invention exhibits improved knitline strength and improved drop impact results compared with prior art fiberglass-reinforced nylon blends.

21 Claims, No Drawings

GLASS REINFORCED NYLON BLEND WITH IMPROVED KNITLINE STRENGTH

FIELD OF INVENTION

This invention relates to a polymer blend. More particularly, the invention concerns a fiber reinforced polymer alloy comprising a homopolymer or a copolymer of polypropylene and a polyamide.

BACKGROUND OF THE INVENTION

Thermoplastic polyamides such as nylon 6,6 have been widely used in the formation of mechanical parts and electrical parts for which excellent mechanical characteristics, high heat resistance and good durability are required. Although thermoplastic polyamides have good heat resistance and high mechanical strength, they also exhibit relatively poor impact resistance, poor notch sensitivity, and poor moisture resistance.

The impact resistance of thermoplastic polyamides can sometimes be improved by blending them with one or more other polymers to form a blended polymer composition or polymer alloy. Throughout the specification and claims, the terms "blend" and "alloy" are used interchangeably with respect to the polymer composition. In general, the physical blending of polymers does not provide a complete solution to the poor impact properties of polyamides. Generally speaking, polymers that improve the impact resistance of thermoplastic polyamides are generally immiscible with the polyamides, which results in a poor adhesion between the polymers of the blend. As a result, interfaces between blend component domains are areas of weakness in molded parts, which can result in mechanical failure.

As noted above, thermoplastic polyamides tend to absorb water, which can result in the degradation of their desirable properties. The blending of polyolefins with polyamides has been suggested as a method for decreasing the water absorption for such a blend since the water-absorbing portion of the polyamide would be replaced by a polyolefin which is generally hydrophobic. However, initial attempts to blend polyamides and polyolefins were generally unsuccessful because polyamides are incompatible with polyolefins.

It is difficult to obtain a good dispersion of a combination of a polar polymer such as a thermoplastic polyamide with a non-polar polymer such as a polyolefin. U.S. Pat. No. 4,795,782 to Lutz et al. describes a polymer blend that purports to exhibit improved impact resistance, comprising a polyamide, a functionalized polyolefin, and a functionalized elastomer. The functionalized polyolefins are obtained by reacting a polyolefin with an unsaturated mono- or polycarboxylic acid or derivative thereof. Suitable unsaturated mono- or polycarboxylic acids include maleic acid, maleic anhydride, fumaric acid, etc. The functionalized elastomers described in U.S. Pat. No. 4,795,782 are generally functionalized selectively hydrogenated block copolymers of conjugated dienes and vinyl aromatic compounds. The block copolymers are functionalized by grafting the copolymers with a mono- or polycarboxylic acid compound such as maleic acid, maleic anhydride, fumaric acid, etc. Other monomers which are utilized for introducing the functionality include vinyl monomers such as acrylamide, acrylonitrile, monovinyl aromatic compounds (i.e., styrene), vinyl esters, vinyl ethers, etc.

The addition of a graft or a block copolymer of similar chemical structure to the blend components can improve the quality of the dispersion. These copolymer additives, generally referred to as compatibilizers, are often added as a third component to the blend. A compatibilizing agent is a material which, on a molecular scale, has particular regions that are compatible with each of the incompatible constituent polymers. Such compatibilizing agents typically surround one polymeric phase providing a chemical and/or physical bridge to the other polymeric phase. Insomuch as portions of the compatibilizing agent are compatible with each of the constituent polymers, the bonding between the two incompatible polymeric phases is effectively enhanced through this intermediate compatibilizing phase. Such a system of incompatible polymers coupled by a compatibilizing agent results in a material which advantageously combines the more desirable properties of the constituent polymers. Maleic anhydride grafted polypropylene has been suggested as a compatibilizer for polypropylene/nylon blends. The compatibilization of polyethylene/polyamide blends with maleic anhydride grafted polypropylene has been reported.

It is well-known to employ glass fibers into composite articles to strengthen and reinforce the articles. In addition to increased dimensional stability in the presence of moisture, glass fiber facings provide improved physical and mechanical properties. Glass fibers are most generally placed into a plastic or polymer matrix where the high tensile strength glass fibers cause the deformable or elastic matrix to become more rigid. To form glass-reinforced composites, fiber-reinforced resin pellets made of short fibers and thermoplastic resin powder or granules are processed in an extruder. A variety of articles are made of the fiber-reinforced resin pellets by injection molding.

Despite the recent advancements in polymer alloy technology, there remains substantial room for improvement in the polymer alloy field. While articles formed from these alloys initially exhibit good strength, many of these alloys exhibit poor knit-line strength and poor drop-impact results after a period of several months. There remains a need for a glass-filled polymer alloy with improved physical and mechanical properties.

SUMMARY OF INVENTION

The present invention provides a polymer alloy composition formed by melt mixing a composition comprising from about 40% to about 75% by weight of at least one polyamide, from about 10% to about 50% by weight polypropylene, from about 0.01% to about 1.0% by weight of at least one block copolymer comprising a vinyl aromatic monomer and a conjugated diene, and further comprising an unsaturated dicarboxylic reagent, from about 0.1% to about 5.0% by weight of at least one block copolymer or a terpolymer, wherein the terpolymer may have an unsaturated dicarboxylic reagent grafted thereto, from about 0.01% to about 7.5% of a compatibilizing agent comprising an alpha-olefin and an unsaturated dicarboxylic reagent, and from about 5% to about 50% by weight of a filler.

The alloy of the present invention exhibits improved knitline strength and improved drop impact results compared to prior art fiberglass-reinforced nylon blends. The fiberglass-reinforced nylon/polypropylene alloy of the present invention minimizes negative effects due to water absorption commonly experienced when processing glass-filled nylons. The alloy of the present invention has lower water absorption in addition to dimensional stability in high moisture conditions, as well as high heat resistance, improved physical and mechanical properties, and a wide range of processing for various applications.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Unless the context indicates otherwise, throughout the specification and claims, the amount of the polymers present is determined inclusive of fillers, glass or other nonpolymer additives in the polymer compositions. Therefore, the amount of each polymer is determined by dividing the weight of the polymer by the combined weight of all of the components present in the composition.

The fiberglass-reinforced nylonipolypropylene alloy of the present invention exhibits improved knitline strength and improved drop impact results compared to prior art fiberglass-reinforced nylon blends. The fiberglass-reinforced nylon/polypropylene alloy of the present invention minimizes negative effects due to water absorption commonly experienced when processing glass-filled nylons, and exhibits other advantages including dimensional stability in high moisture conditions and high heat resistance. Molded articles formed with the polymer alloys of the present invention have improved physical and mechanical properties including a higher knitline tensile strength, a higher melt flow rate, and a greater tensile strength.

Polymer alloys according to the present invention may be formed by melt mixing a composition comprising from about 40% to about 75% by weight of at least one polyamide (A), from about 10% to about 50% by weight polypropylene (B), from about 0.01% to about 1.0% by weight of at least one block copolymer comprising a vinyl aromatic monomer and a conjugated diene, and further comprise an unsaturated dicarboxylic reagent (C), from about 0.1% to about 5.0% by weight of at least one block copolymer (D)(i) or a terpolymer (D)(ii), wherein the terpolymer (D)(ii) may have an unsaturated dicarboxylic reagent grafted thereto, from about 0.01% to about 7.5% of a compatibilizing agent comprising an alpha-olefin and an unsaturated dicarboxylic reagent (E), and from about 5% to about 50% by weight of a filler (F). These components will be discussed individually below.

Polyamide (A)

The polymer alloy composition includes at least one polyamide resin (A). The polymer blend generally comprises from about 40% to about 75% by weight, and more preferably, from about 40% to about 60% by weight, and most preferably from about 43% to about 60% by weight of the at least one polyamide resin. The polyamides provide the polymer composition of the present invention with desirable properties such as strength and stiffness.

A variety of polyamide resins are suitable for use in the polymer alloy compositions of the present invention, and such polyamide resins include semi-crystalline and amorphous or transparent polyamides. These polyamide resins have been commonly referred to as nylons. Very low viscosity polyamide resins are preferred. Generally, the polyamide resin has a number average degree of polymerization of at least 100 or a number average molecular weight of at least about 11,000 for Nylon 6 and 22,000 for Nylon 6,6.

The polyamide resins can be produced by condensation of equimolar amounts of a saturated dicarboxylic acid containing from 4 to 12 carbon atoms with a diamine in which the diamine contains from about 4 to about 16 carbon atoms. In the alternative, the dicarboxylic acids may be aromatic dicarboxylic acids such as isophthalic or terephthalic acid. Examples of aliphatic saturated dicarboxylic acids include sebacic acid, octadecanoic acid, sebaric acid, azelaic acid, undecanedioic acid, glutaric acid, pimelic acid, and especially adipic acid.

Examples of diamines which can be reacted with dicarboxylic acids to form nylons include diamines such as tetramethylenediamine, pentamethylenediamine, octamethylenediamine, decamethylenediamine, hexadecamethylenediamine, and in particular, hexamethylenediamine. Examples of aromatic amines which can be utilized include para-phenylenediamine and 4,4'-diaminodiphenylsulfone.

Polyamide resins also can be produced by ring-opening polymerization of a cyclic lactam. Excess diamine can be employed to provide an excess of amine ends groups over carboxyl end groups in the polyamide. Examples of specific polyamides which are useful in the compositions of the present invention include polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), and the polyamides produced by the ring opening of lactams such as polycaprolactam, polybutyrolactam, polypivalolactam, polylauriclactam, poly-11-amino undecanoic acid, and bis(para-aminocyclohexyl)methane dodecanoamide, etc.

It is also possible to utilize polyamides prepared by copolymerization of two or more of the above polymers or terpolymerization of the above polymers or their components. For example, a suitable polyamide is an adipic isophthalic acid, hexamethylene diamine copolymer. Other copolymers include nylon-6/nylon-66 and nylon-6/nylon-12.

Generally, the polyamides will have a number average molecular weight of at least about 200 up to about 30,000. In one embodiment, it is preferred to utilize polyamides having a number average molecular weight of at least 5000. The melting points of the useful polyamides range from about 217° C. to about 223° C. for Nylon 6 and about 259° C. to about 265° C. for Nylon 6,6. It is preferred to utilize polyamides which are linear polymers with a melting point in excess of about 220° C. for Nylon 6 and about 262° C. for Nylon 6,6. In addition to the use of copolymers, the polymer compositions of the present invention may also contain a mixture of two or more of the above-described polyamides.

Polypropylene (B)

The polymer compositions according to the present invention comprise from about 10% to about 50% by weight, and more preferably, from about 10% to about 40% by weight of polypropylene. The polypropylene component is preferably either a homopolymer or copolymer of polypropylene or mixtures of homopolymer and copolymer. Throughout this specification and claims, the term polypropylene is intended to encompass polypropylene and copolymers thereof.

The polypropylene polymers may either be semicrystalline or crystalline in structure. The number average molecular weight of the polypropylene polymers is preferably above 50,000 and more preferably above about 225,000. There are many commercially available polypropylene polymers suitable for preparing the polymer compositions according to the present invention.

Block Polymers (C)

The polymer compositions of the present invention further include at least one block polymer of a vinyl aromatic monomer and a conjugated diene, a partially hydrogenated derivative thereof, or a selectively hydrogenated derivative thereof, which further comprises an unsaturated dicarboxylic reagent. The block polymer of a vinyl aromatic monomer and a conjugated diene (C) is typically present in an amount from about 0.01% to about 1.0% by weight of the polymer composition. The block polymer (C) contains up to about 50% bound vinyl aromatic monomer.

The block polymers are usually block copolymers, and may be diblock, triblock, multiblock, starblock, polyblock or graftblock polymers. Throughout this specification and claims, the terms diblock, triblock, multiblock, polyblock, and graft or grafted-block with respect to the structural features of block polymers are to be given their normal meaning as defined in the literature such as in the Encyclopedia of Polymer Science and Engineering, Vol. 2, (1985) John Wiley.& Sons, Inc., New York, pp. 325–326, and by J. E. McGrath in *Block Copolymers, Science Technology*, Dale J. Meier, ed., Harwood Academic Publishers, 1979, at pages 1–5.

These block copolymers may contain various ratios of conjugated dienes to vinyl aromatic monomer. Accordingly, multiblock polymers may be utilized which are linear or radial symmetric or asymmetric and which have structures represented by the formulae A-B, A-B-A, A-B-A-B, B-A-B, $(AB)_{0,1,2}\ldots BA$, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques. It is known that tapered polymer blocks can be incorporated in the multiblock copolymers by copolymerizing a mixture of conjugated diene and vinyl aromatic monomer monomers utilizing the difference in their copolymerization reactivity rates.

Conjugated dienes that may be used to prepare the block polymers are those containing from 4 to about 10 carbon atoms, and more particularly, from 4 to 6 carbon atoms. Examples include 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes may also be used. The preferred conjugated dienes are isoprene and 1,3-butadiene.

The vinyl aromatic monomers that may be utilized to prepare the block polymers are described above. A preferred vinyl aromatic monomer is styrene. Many of the above-described polymers of conjugated dienes and vinyl aromatic compounds are commercially available. The number average molecular weight of the block polymers prior to hydrogenation, is from about 20,000 to about 500,000, preferably from about 40,000 to about 300,000.

The average molecular weights of the individual blocks within the block copolymers may vary within certain limits. In most instances, the vinyl aromatic block will have a number average molecular weight in the order of about 2000 to about 125,000, and preferably between about 4000 and about 60,000. The conjugated diene blocks either before or after hydrogenation will have number average molecular weights in the order of about 10,000 to about 450,000 and more preferably from about 35,000 to 150,000.

Prior to hydrogenation the vinyl content of the block polymer is from about 10% to about 80%, and the vinyl content is preferably from about 25% to about 65%, and more preferably from about 35% to about 55% when it is desired that the modified block polymer exhibit rubbery elasticity. The vinyl content of the block polymer can be measured by means of NMR spectroscopy.

Specific examples of diblock copolymers include styrene-butadiene, styrene-ethylene, and hydrogenated derivatives thereof. Examples of triblock polymers include styrene-butadiene-styrene, styrene-isoprene-styrene, alpha-methylstyrene-butadiene-alpha-methylstyrene, and their partially hydrogenated derivatives. Examples of preferred multiblock polymers include multiblock polymers of styrene and either isoprene or butadiene. The diblock, triblock, multiblock, and starblock polymers are commercially available from a variety of sources under various trade names.

The selective hydrogenation of the block polymers may be carried out by a variety of well-known processes including hydrogenation in the presence of catalysts such as Raney nickel, metals such as platinum and palladium, and soluble transition metal catalysts. A suitable hydrogenation process is one in which the diene-containing polymer or polymers are dissolved in an inert hydrogenation diluent such as cyclohexane, and are hydrogenated by a reaction with hydrogen in the presence of a soluble hydrogenation catalyst. Such procedures are disclosed in U.S. Pat. Nos. 3,113,986 and 4,226,952. The selectively hydrogenated polymers have a residual unsaturation content in the polydiene block from about 0.5% to about 20% of their original unsaturation content prior to hydrogenation. In one embodiment, the conjugated diene portion of the block polymer is at least 90% saturated, and more often at least 95% saturated, while the vinyl aromatic portion is not significantly hydrogenated.

The block polymers of the vinyl aromatic monomer and the conjugated diene may also be grafted with one or more unsaturated monocarboxylic or dicarboxylic reagents. The carboxylic reagents include carboxylic acids and their functional derivatives, such as anhydrides, imides, metal salts, esters, etc., which are capable of being grafted onto the block polymer. The grafted polymer will usually contain from about 0.2% to about 20% and preferably from about 0.1% to about 10% by weight based on the total weight of the block polymer and the carboxylic reagent of the grafted carboxylic acid. Specific examples of useful monocarboxylic acids and their derivatives include acrylic acid, methacrylic acid, cynamic acid, crotonic acid, acrylic anhydride, sodium acrylate, calcium acrylate, magnesium acrylate, etc. Specific examples of useful dicarboxylic acids and their derivatives include maleic acid, maleic anhydride, fumaric acid, mesaconic acid, itaconic acid, citraconic acid, itaconic anhydride, citraconic anhydride, monomethyl maleate, monosodium maleate, etc.

In order to graft the carboxylic acid reagent to the hydrogenated block polymer, free radical initiators are utilized, and these initiators include peroxides and various organic azo compounds. The amount of initiator utilized is generally from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

Examples of commercially available maleated selectively hydrogenated polymers of styrene and butadiene include KRATON™ FG1901X available from Kraton Polymers, which is a clear linear triblock copolymer based on styrene and ethylene/butylene, with a polystyrene content of 30%.

Block Polymer or Terpolymer (D)

The polymer compositions according to the present invention also include at least one block polymer (D)(i) or terpolymer (D)(ii), a partially hydrogenated derivative thereof, or a selectively hydrogenated derivative thereof. The block polymer or terpolymer (D) is typically present in an amount from about 0.1% to about 5.0% by weight of the polymer composition.

The block polymer of (D)(i) will often be a copolymer, and may include a vinyl aromatic monomer and a conjugated diene, or a partially hydrogenated derivative thereof, or a selectively hydrogenated derivative thereof. The block copolymer of (D)(i) may contain up to about 50% bound vinyl aromatic monomer. An example of a useful block polymer is a SEBS block polymer such as KRATON™ G-1652, which is available from Kraton Polymers. KRATON™ G-1652 is a triblock copolymer with polystyrene end blocks and a rubbery poly(ethylene-butylene) mid block.

A suitable terpolymer according to (D)(ii) is an EPDM copolymer (or ethylene-propylene-diene with "M" referring to the saturated backbone structure). Considering the EPDM copolymers, the amount of the diene repeating units is generally small as up to about 10% by weight and desirably up to about 4% by weight. Hence, the remaining portion of the copolymer consists of repeating units of ethylene and propylene in various amounts. Examples of suitable dienes include 1,4-hexadiene, dicyclopentadiene, ethylidene norbornene, methylene norbornene, and the like. There are many commercially available EPDM terpolymers.

Optionally, the terpolymer (D)(ii) may have grafted thereto one or more unsaturated monocarboxylic or dicarboxylic reagents. The carboxylic reagents include carboxylic acids and their functional derivatives, such as anhydrides, imides, metal salts, esters, etc., which are capable of being grafted onto the block polymer. The grafted polymer will usually contain from about 0.2% to about 20% and preferably from about 0.1% to about 10% by weight based on the total weight of the terpolymer and the carboxylic reagent of the grafted carboxylic acid. Specific examples of useful monocarboxylic acids and their derivatives include acrylic acid, methacrylic acid, cynamic acid, crotonic acid, acrylic anhydride, sodium acrylate, calcium acrylate, magnesium acrylate, etc. Specific examples of useful dicarboxylic acids and their derivatives include maleic acid, maleic anhydride, fumaric acid, mesaconic acid, itaconic acid, citraconic acid, itaconic anhydride, citraconic anhydride, monomethyl maleate, monosodium maleate, etc. An example of a useful terpolymer is an EPDM terpolymer such as Royaltuf® 485, available from Uniroyal/Crompton Corporation, which includes a maleic anhydride graft.

Compatibilizing Agent (E)

The polymer compositions according to the present invention further include one or more compatibilizing agents. The compatibilizing agent includes the product of the reaction of at least one alpha-olefin polymer and an unsaturated carboxylic acid reagent. Generally, the polymer composition contains from about 0.01% to about 7.5% by weight of the compatibilizing agent (E).

The alpha-olefin polymers employed in the compatibilizing agent are semi-crystalline or crystalizable olefin polymers including homopolymers, copolymers, terpolymers or mixtures thereof, and contain one or more monomeric units. Preferably, the alpha-olefin polymer is derived from an alpha-olefin such as ethylene, propylene, 1-butene, etc. The olefin polymers are preferably polyethylenes, polypropylenes, or mixtures thereof. The number average molecular weight of the polyolefins utilized in the reaction with the carboxylic acid reagent is generally lower than the number average molecular weight of the polypropylene utilized as a major component in the blended polymer compositions of the present invention, described above as component (B).

The amount of carboxylic acid reagent reacted with the polyolefin may range from about 0.2% to about 20% by weight based on the weight of the alpha-olefin polymer. More generally, the amount of acid reagent reacted with the polyolefin will be less than 10% and most often between about 0.1% and 5% by weight. The unsaturated carboxylic acid reagent may be an alpha, beta-olefinically unsaturated carboxylic acid reagent. Examples of suitable reagents are described above as suitable reagents for grafting to the terpolymers in section (D). The carboxylic reagents include carboxylic acids and their functional derivatives, such as anhydrides, imides, metal salts, esters, etc. A particularly preferred alpha, beta-olefinically unsaturated carboxylic reagent is maleic acid. The corresponding anhydride, maleic anhydride, is also a preferred carboxylic reagent. An example of a commercially available maleic anhydride grafted polypropylene is Polybond 3200 available from Uniroyal. Polybond 3200 contains 1% maleic anhydride.

Fillers (F)

The polymer compositions according to the present invention also comprise one or more fillers (F). The polymer compositions generally comprise from about 5% to about 50% by weight of the one or more fillers. Examples of suitable fillers include glass fibers, carbon fibers, mica, synthetic polymer fibers, boron fibers, wollastonite, dolomite, carbon blacks, talc, calcium carbonate, pigments such as titanium dioxide and mixtures thereof. Preferred fillers include glass fibers, an example of which is 123D-10P Cratec Plus E glass chopped strands available from Owens Corning. The glass fibers may be treated with coupling agents to improve the bond between the glass fibers and the polymer resins. For example, the glass fibers can be treated with materials such as fatty acids, silanes, maleated polypropylene, etc. The amount of coupling agent used is an amount effective to improve the bond between the glass fibers and polymer resin.

The fibers preferably have an average diameter of from about 5 to about 25 microns, and an average length of from about 0.125" to about 0.500". Preferably, the fibers have an aspect ratio (i.e., the ratio of the fiber length to the fiber diameter) of from about 10 to about 500.

Other additives may be included in the polymer compositions according to the present invention to modify or to obtain desirable properties. For example, stabilizers and inhibitors of oxidative, thermal and ultraviolet light degradation may be included in the polymer blends as well as lubricants and mold release agents, colorants including dyes and pigments, nucleating agents, plasticizers, flame retardants, etc., may be included in the polymer compositions.

The stabilizers can be incorporated into the composition at any stage in the preparation of the polymer blends, and preferably, the stabilizers are included early to preclude the initiation of the degradation before the composition can be protected. The oxidative and thermal stabilizers useful in the polymer blends of the present invention include those used in addition polymers generally. They include, for example, up to about 1% by weight, based on the weight of the polymer blend, of Group I metal halides such as sodium, potassium, lithium and cuprous halides (e.g., chloride, bromide, and iodide), hindered phenols, hydroquinones, and various substituted derivatives of these materials and combinations thereof.

The ultraviolet light stabilizers may be included in amounts of up to about 2% by weight based on the weight of the polymer blend. Examples of ultraviolet light stabilizers include various substituted resorcinols, salicylates, benzotriazoles, benzophenones, etc.

Suitable lubricants and mold release agents may be included in amounts of up to about 1% by weight based on the weight of the polymer blend include materials such as stearic acid, stearic alcohol, stearic acid salts, stearamides, organic dyes such as nigrosine, pigments such as titanium dioxide, cadmium sulfide, carbon black, etc. The plasticizers which may be included in amounts of up to about 20% by weight based on the weight of the polymer blend include materials such as dioctylphthalate, bibenzylphthalate, butylbenzophthalate, hydrocarbon oils, sulfonamides such as paratoluene ethyl sulfonamides, n-butylbenzene sulfonamide, etc.

The polymer compositions of the present invention exhibit improved knitline strength and improved drop impact results compared to prior art fiberglass-reinforced nylon blends. The glass fibers within the polymer compositions according to the present invention are oriented differently than the glass fibers in previous polymer blends. Without being held to any particular theory, applicants believe that improper orientation of the glass fibers can adversely affect the knitline strength and the durability of the polymer blends. The orientation of the glass fibers within the polymer alloy is adversely affected during the injection molding process due to excessive coupling to the various functional polymeric components. The compatibilizer system of the polymer alloys of the present invention maximizes polymer phase compatibilization without promoting excessive fiber coupling. Excessive fiber coupling is believed to drastically increase viscosity and hinder proper fiber orientation, especially at the knitline. The polymer alloys of the present invention promote proper fiber orientation, which is believed to have a positive effect on knitline strength.

The following examples are intended only to illustrate the invention and should not be construed as imposing limitations upon the claims.

EXAMPLE 1

Compositions A and B, and a control were prepared by combining the components listed below in Table 1 in a Wemer-Pfleiderer twin-screw (70 mm) extruder at 450 rpm. Both compositions were then extruded at 540° F. into strands which were then passed through a water bath prior to pelletizing. The pellets were injection molded at 560° F. into test specimens. The physical properties of the control and Composition A are listed in Table 2, below.

TABLE 1

| Commercial Description | Chemical Name | Control | Composition A | Composition B |
|---|---|---|---|---|
| Rhodia 24AE1 | Nylon 6,6 Resin, Very Low Viscosity (36 RV) | 37.1 | 43.0 | 43.0 |
| Equistar 31S3A | Polypropylene Homopolymer, 3 Melt Flow Rate | 18.6 | 11.45 | 11.45 |
| Kraton FG-1901X | SEBS Terpolymer, 1% Maleic Anhydride Grafted | 3.0 | 0.3 | 0.3 |
| Kraton G-1652 | SEBS Block Copolymer | ** | 2.0 | ** |
| Royaltuf 485 | EPDM Terpolymer with Maleic Anhydride Graft | ** | ** | 2.0 |
| OCF 173X 11C | 11 Micron Fiberglass, Nylon Preparation | 38 | ** | ** |
| OCF 123D 10P | 10 Micron Fiberglass, Nylon Preparation | ** | 40 | 40 |
| Irganox B-225 | Phenolic/Phosphite Antioxidant Blend | 0.4 | 0.25 | 0.25 |
| Irganox B-1171 | Phenolic/Phosphite Antioxidant Blend | 0.4 | 0.25 | 0.25 |
| Uniroyal Polybond 3200 | Polypropylene Homopolymer, 1% Maleic Anhydride Grafted | 1.5 | 2.0 | 2.0 |
| Polymer Partners Nylon BK | 30% Carbon Black Concentrate, Nylon 6,6 Carrier | 1.0 | 0.75 | 0.75 |
| | TOTAL WEIGHT % | 100 | 100 | 100 |

TABLE 2

| Property | Test Method | Units | Control | Composition A |
|---|---|---|---|---|
| Melt Flow Rate @ 275° C., 5 | ASTM D1238 | g/10 min | 2.5 | 25.0 |
| Ash Content | ASTM D2584 | % | 38 | 38 |
| Notched Izod @ 23° C. | ASTM D256 | ft-lb/in | 2.9 | 2.9 |
| Unnotched Izod | ASTM D4812 | ft-lb/in | 20.5 | 21.6 |
| Tensile Strength | ASTM D638 | psi | 20,510 | 22,000 |
| Elongation at break | ASTM D638 | % | 5.5 | 6.1 |
| Flexural Strength | ASTM D790 | psi | 30,120 | 32,930 |
| Tangent Modulus | ASTM D790 | psi | 1,223,500 | 1,390,000 |
| Secant Modulus, 1% | ASTM D790 | psi | 1,188,000 | 1,350,000 |
| Instrumented Impact | ASTM D3763 | in-lb | 90 | 130 |
| Specific Gravity | ASTM D792 | — | 1.34 | 1.35 |
| HDT @ 264 psi | ASTM D648 | ° F. | 472 | 472 |
| Knitline Tensile Strength | ASTM D63B | psi | 6,000 | >13,000 |

In comparing the physical properties of Composition A to the Control, it is evident that the knitline tensile strength of Composition A is more than two times the knitline tensile strength of the control sample. In addition to having a stronger knitline, Composition A also has a higher instrumented impact compared to the control. Composition A also has a higher melt flow rate, and a higher tensile strength overall. The physical properties of Composition B were found to be nearly identical to those of Composition A.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A polymer alloy formed by melt mixing a composition comprising:
   (A) from about 40% to about 75% by weight of at least one polyamide;
   (B) from about 10% to about 50% by weight polypropylene;
   (C) from about 0.01% to about 1.0% by weight of a block copolymer comprising a vinyl aromatic monomers and conjugated diene monomers, to which has been grafted an unsaturated dicarboxylic acid or functional derivative thereof;
   (D) from about 0.1% to about 5.0% by weight of
      (i) a block copolymer of a vinyl aromatic monomer and a conjugated diene, to which no dicarboxylic acid or functional derivative thereof has been grafted; or
      (ii) an EPDM terpolymer,
   (E) from about 0.01% to about 7.5% of a compatibilizing agent comprising the reaction product of an alpha-olefin polymer and an unsaturated dicarboxylic acid or functional derivative thereof; and
   (F) from about 5% to about 50% by weight of a filler.

2. The polymer alloy according to claim 1 wherein said composition comprises from about 43% to about 60% by weight of the at least one polyamide (A).

3. The polymer alloy according to claim 1 wherein the polyamide is selected from the group consisting of polyhexamethylene adipamide, polyhexamethylene sebacamide, polycaprolactam, polyhexamethylene isophthalamide, polyhexamethylene tere-co-isophthalamide, polytetramethylene adipamide and mixtures thereof.

4. The polymer alloy according to claim 1 wherein the block copolymer of (C) is a styrene-ethylene/butylene-styrene block copolymer.

5. The polymer alloy according to claim 1 wherein the block copolymer of (D)(i) is a styrene-ethylene/butylene-styrene block copolymer.

6. The polymer alloy according to claim 1 wherein the diene of the EPDM terpolymer selected from the group consisting of 1,3-butadiene; isoprene; 2,3-dimethyl 1,3-butadiene; chloroprene; 1,3-pentadiene; 1,3-hexadiene; 1,4-hexadiene; dicyclopentadiene; ethylidene norbornene; and, methylene norbornene.

7. The polymer alloy according to claim 1 wherein the unsaturated dicarboxylic acid or functional derivative thereof of (C) comprises maleic anhydride.

8. The polymer alloy according to claim 1 wherein the EPDM terpolymer further comprises an unsaturated dicarboxylic acid or functional derivative thereof grafted to the terpolymer.

9. The polymer alloy according to claim 8 wherein the unsaturated dicarboxylic acid or functional derivative thereof of (D)(ii) comprises maleic anhydride.

10. The polymer alloy according to claim 1 wherein the unsaturated dicarboxylic acid or functional derivative thereof of (E) comprises maleic anhydride.

11. The polymer alloy according to claim 1 wherein the alpha-olefin of (E) is selected from the group consisting of propylene and copolymers thereof.

12. The polymer alloy according to claim 1 wherein the filler comprises glass fiber.

13. A polymer alloy formed by melt mixing a composition comprising:
   (A) from about 43% to about 60% by weight of at least one polyamide;
   (B) from about 10% to about 40% by weight polypropylene;
   (C) from about 0.01% to about 1.0% by weight of a first block copolymer comprising vinyl aromatic monomers, and conjugated diene monomers, wherein maleic anhydride is grafted to the first block copolymer;
   (D) from about 0.1% to about 5.0% by weight of
      a second block copolymer selected from the group consisting of dicarboxylic acid grafted SEBS, dicarboxylic acid derivative grafted SEBS and an EPDM terpolymer
   (E) from about 1.5% to about 7.5% of a compatibilizing agent comprising polypropylene and maleic anhydride; and
   (F) from about 5% to about 50% by weight of a filler comprising glass fibers.

14. The polymer alloy according to claim 13 wherein the polyamide is selected from the group consisting of polyhexamethylene adipamide, polyhexamethylene sebacamide, polycaprolactam, polyhexamethylene isophthalamide, polyhexamethylene tere-co-isophthalamide, polytetramethylene adipamide and mixtures thereof.

15. The polymer alloy according to claim 13 wherein the first block copolymer is a styrene-ethylene/butylenestyrene block copolymer.

16. The polymer alloy according to claim 13 wherein the second block copolymer is a styrene-ethylene/butylene-styrene block copolymer.

17. The polymer alloy according to claim 13 wherein the diene in the EPDM terpolymer selected from the group consisting of 1,4-hexadiene, dicyclopentadiene, ethylidene norbornene, and methylene norbornene.

18. The polymer alloy according to claim 13 wherein the EPDM terpolymer of (D)(ii) further comprises maleic acid grafted to the terpolymer.

19. A polymer alloy formed by melt mixing a composition comprising:
   (A) about 43% by weight of at least one polyamide;
   (B) about 11% by weight of polypropylene;
   (C) about 0.3% by weight of a first block copolymer comprising vinyl aromatic monomers and conjugated diene monomers, wherein an unsaturated dicarboxylic acid or functional derivative thereof is grafted to the block copolymer;
   (D) about 2% by weight of a second block copolymer selected from the group consisting of SEBS and an EPDM terpolymer,
   (E) about 2% by weight of a compatibilizing agent comprising polypropylene and maleic anhydride; and
   (F) from about 5% to about 50% by weight of a filler comprising glass fibers.

20. The polymer alloy of claim 19 wherein:
   the polyamide is selected from the group consisting of polyhexamethylene adipamide, polyhexamethylene azelamide, polyhexamethylene sebacamide, and polyhexamethylene dodecanoamide;

the first block copolymer comprises a SEBS-maleic anhydride graft polymer;

the second block copolymer comprises SEBS;

the compatibilizing agent comprises a polypropylene-maleic anhydride graft polymer containing about 1% maleic anhydride; and, the filler comprises about 40% of a carbon fiber having an average diameter of from about 5 to about 25 microns, and an average length of from about 0.125" (3.2 mm) to about 0.500" (12.7 mm).

21. The polymer alloy of claim 19 wherein:

the polyamide comprises polyhexamethylene adipamide;

the first block copolymer comprises a SEBS-maleic anhydride graft polymer containing about 1% maleic anhydride;

the second block copolymer comprises an EPDM terpolymer to which has been grafted maleic anhydride; wherein the diene in the EPDM is selected from the group consisting of 1,3-butadiene; isoprene; 2,3-dimethyl 1,3-butadiene; chloroprene; 1,3-pentadiene; and 1,3-hexadiene;

the compatibilizing agent comprises a polypropylene-maleic anhydride graft polymer containing about 1% maleic anhydride; and, the filler comprises about 40% of a carbon fiber having an average diameter of about 10 microns, and an average length of from about 0.125" (3.2 mm) to about 0.500" (12.7 mm).

* * * * *